US012592248B2

(12) United States Patent
Watkins et al.

(10) Patent No.: US 12,592,248 B2
(45) Date of Patent: Mar. 31, 2026

(54) ACTIVE SPEAKER BASED INTELLIGENT AUDIO-VISUAL CALL-RESPONSE SYSTEM

(71) Applicant: Rockwell Collins, Inc., Cedar Rapids, IA (US)

(72) Inventors: David Watkins, Layton, UT (US); Naresh Yarlapati Ganesh, Cork (IE)

(73) Assignee: Rockwell Collins, Inc., Cedar Rapids, IA (US)

( * ) Notice: Subject to any disclaimer, the term of this patent is extended or adjusted under 35 U.S.C. 154(b) by 98 days.

(21) Appl. No.: 18/423,009

(22) Filed: Jan. 25, 2024

(65) Prior Publication Data

US 2025/0246199 A1 Jul. 31, 2025

(51) Int. Cl.
| | |
|---|---|
| *G10L 25/63* | (2013.01) |
| *G05D 1/654* | (2024.01) |
| *G10L 13/02* | (2013.01) |
| *G10L 15/22* | (2006.01) |
| *G10L 25/66* | (2013.01) |

(52) U.S. Cl.
CPC ............. *G10L 25/63* (2013.01); *G05D 1/654* (2024.01); *G10L 13/02* (2013.01); *G10L 15/22* (2013.01); *G10L 25/66* (2013.01)

(58) Field of Classification Search
CPC ............... B64D 45/00; B64D 45/0031; B64D 45/0059; B64D 45/0056; G10L 25/63; G10L 15/22; G10L 25/66; G10L 13/02; G05D 1/654
See application file for complete search history.

(56) References Cited

U.S. PATENT DOCUMENTS

| | | | |
|---|---|---|---|
| 8,289,172 B2 | 10/2012 | Matos | |
| 9,336,268 B1 * | 5/2016 | Moudy | G06F 40/20 |
| 10,426,393 B2 | 10/2019 | Bosworth et al. | |
| 10,816,970 B2 | 10/2020 | Bosworth et al. | |
| 2016/0163332 A1 * | 6/2016 | Un | G06F 16/90332 |
| | | | 704/260 |
| 2017/0277185 A1 | 9/2017 | Duda et al. | |
| 2018/0150739 A1 * | 5/2018 | Wu | G06N 20/10 |
| 2018/0174020 A1 * | 6/2018 | Wu | G06F 16/3329 |
| 2018/0322403 A1 * | 11/2018 | Ron | G06N 5/04 |
| 2019/0012591 A1 * | 1/2019 | Limsopatham | G06N 3/042 |
| 2019/0090800 A1 * | 3/2019 | Bosworth | A61B 5/0015 |

(Continued)

FOREIGN PATENT DOCUMENTS

| | | |
|---|---|---|
| EP | 3459857 A1 | 3/2019 |
| EP | 4099289 A1 | 12/2022 |

OTHER PUBLICATIONS

European Search Report received in EP Application No. 25154249. 4, May 26, 2025, 8 pages.

*Primary Examiner* — Mohammad K Islam
(74) *Attorney, Agent, or Firm* — Suiter Swantz IP

(57) ABSTRACT
A system and method for determining an incapacitation state of an occupant is disclosed. The system may include an audio sensor configured to sense sensor data including active speaker audio of an occupant of two or more occupants. The system may also include a controller communicatively coupled to the audio sensor and configured to execute program instructions causing the processors to identify the active speaker, assign an identification code, receive a trigger, query a call response module, determine the occupant state, and direct aircraft operations based on the occupant state.

20 Claims, 4 Drawing Sheets

138—

(56)     References Cited

U.S. PATENT DOCUMENTS

| | | |
|---|---|---|
| 2020/0007380 A1* | 1/2020 | Chen ........................ G06N 3/09 |
| 2020/0290740 A1 | 9/2020 | Rangan |
| 2021/0034053 A1 | 2/2021 | Nikolic et al. |
| 2021/0125610 A1* | 4/2021 | Cheung ............... G06F 16/9535 |
| 2022/0265187 A1 | 8/2022 | Salmon-Legagneur et al. |
| 2022/0306143 A1* | 9/2022 | Samani ............... B60W 60/001 |
| 2023/0144801 A1 | 5/2023 | Pankok et al. |
| 2023/0297123 A1 | 9/2023 | Feyereisen et al. |

\* cited by examiner

138

| 100 | AIRCRAFT |
|---|---|

102 AIRCRAFT CONTROLLER

104 PROCESSORS

106 MEMORY
108

110 COMMUNICATION INTERFACES

116 USER INTERFACES

112 DISPLAY DEVICES

114 USER INPUT DEVICES

118 SENSORS

120 NAVIGATION SYSTEMS

134 SATELLITES

124 OFFBOARD CONTROLLER

126 PROCESSORS

128 MEMORY
130

132 COMMUNICATION INTERFACES

122 GPS SATELLITES

300

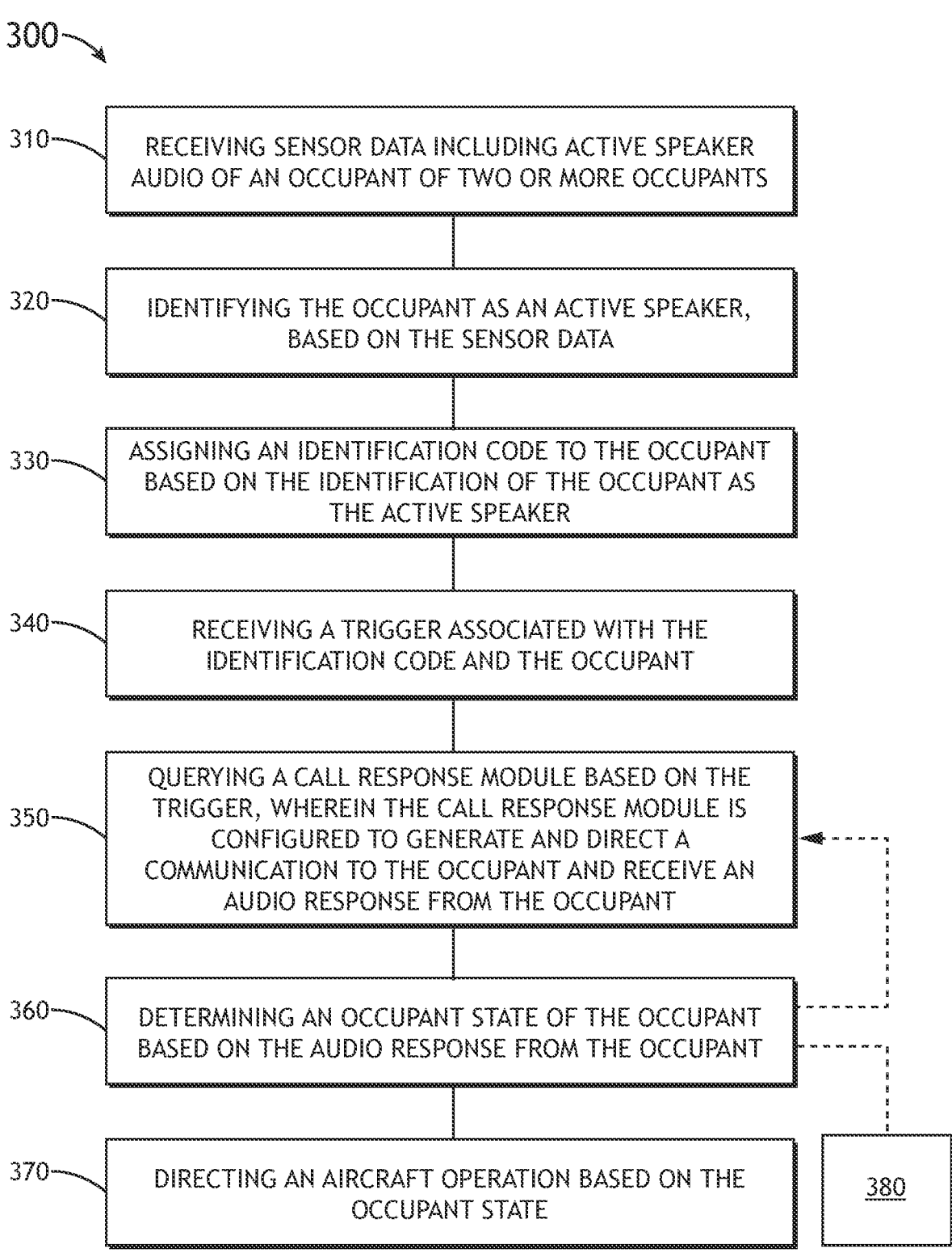

310 — RECEIVING SENSOR DATA INCLUDING ACTIVE SPEAKER AUDIO OF AN OCCUPANT OF TWO OR MORE OCCUPANTS

320 — IDENTIFYING THE OCCUPANT AS AN ACTIVE SPEAKER, BASED ON THE SENSOR DATA

330 — ASSIGNING AN IDENTIFICATION CODE TO THE OCCUPANT BASED ON THE IDENTIFICATION OF THE OCCUPANT AS THE ACTIVE SPEAKER

340 — RECEIVING A TRIGGER ASSOCIATED WITH THE IDENTIFICATION CODE AND THE OCCUPANT

350 — QUERYING A CALL RESPONSE MODULE BASED ON THE TRIGGER, WHEREIN THE CALL RESPONSE MODULE IS CONFIGURED TO GENERATE AND DIRECT A COMMUNICATION TO THE OCCUPANT AND RECEIVE AN AUDIO RESPONSE FROM THE OCCUPANT

360 — DETERMINING AN OCCUPANT STATE OF THE OCCUPANT BASED ON THE AUDIO RESPONSE FROM THE OCCUPANT

370 — DIRECTING AN AIRCRAFT OPERATION BASED ON THE OCCUPANT STATE

ACTIVE SPEAKER BASED INTELLIGENT AUDIO-VISUAL CALL-RESPONSE SYSTEM

TECHNICAL FIELD

The present disclosure relates generally to aircraft operation safety, and, more particularly, to determining the incapacitation of occupants.

BACKGROUND

An aircraft cockpit may include multiple pilot occupants. In rare circumstances, a pilot may be become incapacitated. For example, the pilot may become unconscious, fatigued to the point of non-responsiveness, or suffering from hypoxia, delirium, and/or the like.

Some methods may allow some level of detection of pilot responsiveness. However, such methods do not necessarily validate such detections to a high level of certainty.

SUMMARY

A system for determining an incapacitation state of an occupant is disclosed in accordance with one or more illustrative embodiments of the present disclosure. In one illustrative embodiment, the system may include an audio sensor configured to sense sensor data including active speaker audio of an occupant of two or more occupants. In another illustrative embodiment, a controller may be communicatively coupled to the audio sensor, and the controller may include one or more processors configured to execute program instructions. In another illustrative embodiment, the processors may be caused to receive the sensor data including the active speaker audio of the occupant, identify the occupant as an active speaker, assign an identification code to the occupant based on the identification, receive a trigger associated with the identification code and the occupant, query a call response module based on the trigger, determine an occupant state of the occupant based on the audio response from the occupant, and direct an aircraft operation based on the occupant state.

In a further aspect, the call response module may include a machine learning module. In another aspect, the call response module may be configured to generate synthetic audio speech of the communication. In another aspect, the system may further include an incapacitation predictor module configured to predict a predicted incapacitation state of at least one of the two or more occupants based on occupant sensor data received via one or more occupant capacity sensors. In another aspect, the trigger may be based on the occupant sensor data, and the controller may be further configured to validate the predicted incapacitation state based on the trigger. In another aspect, the controller may be further configured to generate a query through a state validator module based on the trigger. In another aspect, the controller may be further configured to receive aircraft operation instructions via a pilot digital assistant module. In another aspect, the aircraft operation may include an autopilot landing procedure. In another aspect, the aircraft operation may include a transmission to Air Traffic Control (ATC) to request a landing location. In another aspect, the controller may be further configured to perform the querying and determining of the occupant state multiple times in sequence to confirm the occupant state.

A method for determining an incapacitation state of an occupant is disclosed in accordance with one or more illustrative embodiments of the present disclosure. In one illustrative embodiment, the method may include receiving sensor data that includes active speaker audio of an occupant among two or more occupants. In another illustrative embodiment, the method may involve identifying the occupant as an active speaker based on the sensor data. In another illustrative embodiment, the method may include assigning an identification code to the occupant based on the identification of the occupant as the active speaker. In another illustrative embodiment, the method may further include receiving a trigger associated with the identification code and the occupant. In another illustrative embodiment, the method may involve querying a call response module based on the trigger, where the call response module is configured to generate and direct a communication to the occupant and receive an audio response from the occupant. In another illustrative embodiment, the method may include determining an occupant state of the occupant based on the audio response from the occupant. In another illustrative embodiment, the method may also include directing an aircraft operation based on the occupant state.

In a further aspect, the call response module may include a machine learning module. In another aspect, the call response module may be configured to generate synthetic audio speech of the communication. In another aspect, the method may further include receiving occupant sensor data configured to sense an incapacitation state of at least one of the two or more occupants via an incapacitation predictor module and predicting a predicted incapacitation state of at least one of the two or more occupants based on occupant sensor data received via one or more occupant capacity sensors. In another aspect, the trigger may be based on occupant sensor data, where the query is configured to validate the predicted incapacitation state. In another aspect, the query may be configured to be generated by a state validator module. In another aspect, the aircraft operation may be received via a pilot digital assistant module. In another aspect, the aircraft operation may include an autopilot landing procedure. In another aspect, the aircraft operation may include a transmission to Air Traffic Control (ATC) to request a landing location. In another aspect, the querying and the determining the occupant state may be performed multiple times in sequence to confirm the occupant state at any instant in time during flight.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 3 is a flow diagram illustrating steps performed in a method for determining an incapacitation state of an occupant, in accordance with one or more embodiments of the present disclosure.

DETAILED DESCRIPTION

Figure 1A:
FIG. 1A illustrates a simplified block diagram of an aircraft including the system for determining an incapacitation state of an occupant, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Broadly speaking, embodiments disclosed herein are directed to a system and method for aiding in identifying which occupant (e.g., pilot) is incapacitated, if any, and any related steps. Embodiments may provide a secondary means from which pilot state monitoring may be validated to ensure false-positives are mitigated and a robust state determination is possible. In embodiments, active speakers may be identified in an area, such as during normal speaking in a multi-occupant cockpit, and assigned an identification code (ID), such as an anonymous and unique number. Then, when desired (e.g., when suspected a pilot is unconscious), an occupant associated with an ID may be communicated with using a Call Response System to validate/confirm the capacity of the occupant, such as whether the occupant is conscious and fit to perform their duties. The communication with the occupant may be based on a trigger, such as, but not necessarily limited to, a request initiated by Air Traffic Control (ATC), an onboard pilot incapacitation state prediction module configured to sense signs of incapacitation, and/or the like. The communication to validate the state of the occupant may be performed via a language machine learning model and synthetic voice output. The communication may validate the occupant's capacitation such that the validation correlates to the known ID, reducing confusion of which and how many occupants are incapacitated. The communication may be performed multiple times (e.g., three times) to confirm the incapacitation state.

It is contemplated that such a system and method may provide benefits such as being fast (e.g., near instantaneous initiation of validation), accurate (e.g., based on incapacitation sensors and validation/confirmation (or lack thereof) with occupant), robust (e.g., capable of being performed onboard even when external communications are lost), and/or the like. For example, other methodologies for confirming occupant capacitation may suffer from confusion (e.g., confusion over which pilot is responding and which is incapacitated; confusion mistaking a loss of communication as incapacitation; and/or the like); delay (e.g., not knowing when to initiate a request for a pilot to confirm they are conscious due to ATC not having a video feed to predict a pilot's incapacitation). Further benefits of embodiments may include directing an aircraft operation based on the occupant state. For instance, the system or method may request (e.g., via synthetic speech or data transmission) a location for emergency landing and/or perform an emergency landing using autopilot or the like.

Figure 1B:
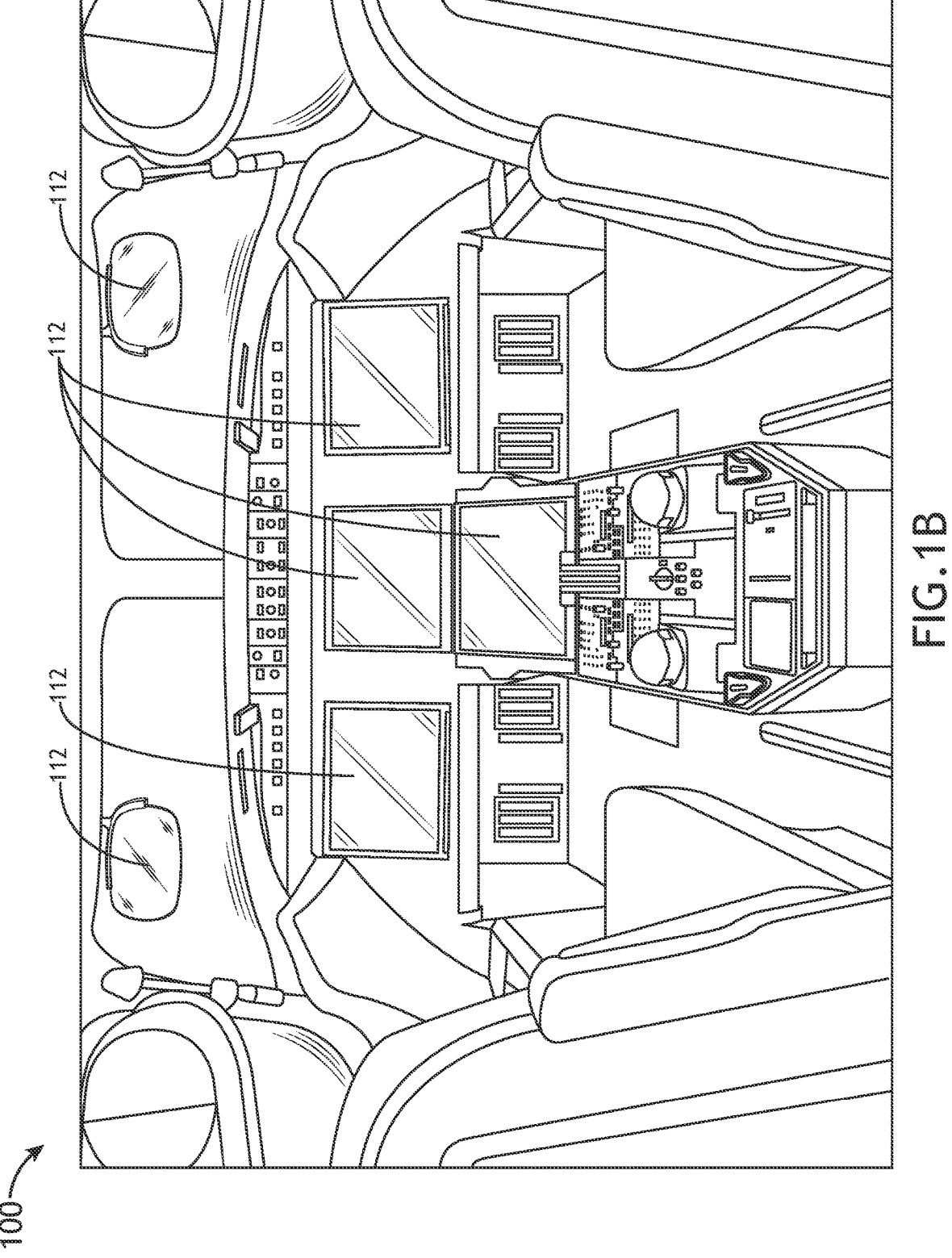
FIG. 1B illustrates an aircraft including the system for determining an incapacitation state of an occupant, in accordance with one or more embodiments of the present disclosure.

FIGS. 1A-1B illustrate an aircraft including a system for sensing an incapacitation state of an occupant, in accordance with one or more embodiments of the present disclosure.

Referring now to FIG. 1A, the aircraft 100 may include an aircraft controller 102 (e.g., on-board/run-time controller). The aircraft controller 102 may include one or more processors 104, memory 106 configured to store one or more program instructions 108, and/or one or more communication interfaces 110.

The aircraft 100 may include an avionics environment such as, but not limited to, a cockpit. The aircraft controller 102 may be coupled (e.g., physically, electrically, and/or communicatively) to one or more display devices 112. The one or more display devices 112 may be configured to display three-dimensional images and/or two-dimensional images. Referring now to FIG. 11B, the avionics environment (e.g., the cockpit) may include any number of display devices 112 (e.g., one, two, three, or more displays) such as, but not limited to, one or more head-down displays (HDDs) 112, one or more head-up displays (HUDs) 112, one or more multi-function displays (MFDs), one or more adaptive flight displays (AFDs) 112, one or more primary flight displays (PFDs) 112, or the like. The one or more display devices 112 may be employed to present flight data including, but not limited to, occupant incapacitation state data and/or flight queue data to a pilot or other crew member.

Referring again to FIG. 1A, the aircraft controller 102 may be coupled (e.g., physically, electrically, and/or communicatively) to one or more user input devices 114. The one or more display devices 112 may be coupled to the one or more user input devices 114. For example, the one or more display devices 112 may be coupled to the one or more user input devices 114 by a transmission medium that may include wireline and/or wireless portions. The one or more display devices 112 may include and/or be configured to interact with one or more user input devices 114.

The one or more display devices 112 and the one or more user input devices 114 may be standalone components within the aircraft 100. It is noted herein, however, that the one or more display devices 112 and the one or more user input devices 114 may be integrated within one or more common user interfaces 116.

Where the one or more display devices 112 and the one or more user input devices 114 are housed within the one or more common user interfaces 116, the aircraft controller 102, one or more offboard controllers 124, and/or the one or more common user interfaces 116 may be standalone components. It is noted herein, however, that the aircraft controller 102, the one or more offboard controllers 124, and/or the one or more common user interfaces 116 may be integrated within one or more common housings or chassis.

The aircraft controller 102 may be coupled (e.g., physically, electrically, and/or communicatively) to and configured to receive data from one or more aircraft sensors 118. The one or more aircraft sensors 118 may be configured to sense a particular condition(s) external or internal to the aircraft 100 and/or within the aircraft 100. The one or more aircraft sensors 118 may be configured to output data associated with particular sensed condition(s) to one or more components/systems onboard the aircraft 100.

Generally, the one or more aircraft sensors 118 may include, but are not limited to, one or more inertial measurement units, one or more airspeed sensors, one or more radio altimeters, one or more flight dynamic sensors (e.g., sensors configured to sense pitch, bank, roll, heading, and/or yaw), one or more weather radars, one or more air temperature sensors, one or more surveillance sensors, one or more air pressure sensors, one or more engine sensors, and/or one or more optical sensors (e.g., one or more cameras configured to acquire images in an electromagnetic spectrum range including, but not limited to, the visible light spectrum range, the infrared spectrum range, the ultraviolet spectrum range, or any other spectrum range known in the art).

The aircraft controller 102 may be coupled (e.g., physically, electrically, and/or communicatively) to and configured to receive data from one or more navigational systems 120. The one or more navigational systems 120 may be coupled (e.g., physically, electrically, and/or communicatively) to and in communication with one or more GPS satellites 122, which may provide vehicular location data (e.g., aircraft location data) to one or more components/systems of the aircraft 100. For example, the one or more navigational systems 120 may be implemented as a global navigation satellite system (GNSS) device, and the one or more GPS satellites 122 may be implemented as GNSS satellites. The one or more navigational systems 120 may include a GPS receiver and a processor. For example, the one or more navigational systems 120 may receive or calculate location data from a sufficient number (e.g., at least four) of GPS satellites 122 in view of the aircraft 100 such that a GPS solution may be calculated.

It is noted herein the one or more aircraft sensors 118 may operate as a navigation device 120, being configured to sense any of various flight conditions or aircraft conditions typically used by aircraft and output navigation data (e.g., aircraft location data, aircraft orientation data, aircraft direction data, aircraft speed data, and/or aircraft acceleration data). For example, the various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft bank, aircraft roll, aircraft yaw, aircraft heading, air temperature, and/or air pressure. By way of another example, the one or more aircraft sensors 118 may provide aircraft location data and aircraft orientation data, respectively, to the one or more processors 104, 126.

The aircraft controller 102 of the aircraft 100 may be coupled (e.g., physically, electrically, and/or communicatively) to one or more offboard controllers 124.

The one or more offboard controllers 124 may include one or more processors 126, memory 128 configured to store one or more programs instructions 130 and/or one or more communication interfaces 132.

The aircraft controller 102 and/or the one or more offboard controllers 124 may be coupled (e.g., physically, electrically, and/or communicatively) to one or more satellites 134. For example, the aircraft controller 102 and/or the one or more offboard controllers 124 may be coupled (e.g., physically, electrically, and/or communicatively) to one another via the one or more satellites 134. For instance, at least one component of the aircraft controller 102 may be configured to transmit data to and/or receive data from at least one component of the one or more offboard controllers 124, and vice versa. By way of another example, at least one component of the aircraft controller 102 may be configured to record event logs and may transmit the event logs to at least one component of the one or more offboard controllers 124, and vice versa. By way of another example, at least one component of the aircraft controller 102 may be configured to receive information and/or commands from the at least one component of the one or more offboard controllers 124, either in response to (or independent of) the transmitted event logs, and vice versa.

It is noted herein that the aircraft 100 and the components onboard the aircraft 100, the one or more offboard controllers 124, the one or more GPS satellites 122, and/or the one or more satellites 134 may be considered components of a system 138, for purposes of the present disclosure.

The one or more processors 104, 126 may include any one or more processing elements, micro-controllers, circuitry, field programmable gate array (FPGA) or other processing systems, and resident or external memory for storing data, executable code, and other information accessed or generated by the aircraft controller 102 and/or the one or more offboard controllers 124. In this sense, the one or more processors 104, 126 may include any microprocessor device configured to execute algorithms and/or program instructions. It is noted herein, that the one or more processors 104, 126 are not limited by the materials from which it is formed or the processing mechanisms employed therein and, as such, may be implemented via semi-conductor(s) and/or transistors (e.g., using electronic integrated circuit (IC) components), and so forth. In general, the term "processor" may be broadly defined to encompass any device having one or more processing elements, which execute a set of program instructions from a non-transitory memory medium (e.g., the memory), where the set of program instructions is configured to cause the one or more processors to carry out any of one or more process steps.

The memory 106, 128 may include any storage medium known in the art suitable for storing the set of program instructions executable by the associated one or more processors. For example, the memory 106, 128 may include a non-transitory memory medium. For instance, the memory 106, 128 may include, but is not limited to, a read-only memory (ROM), a random access memory (RAM), a magnetic or optical memory device (e.g., disk), a magnetic tape, a solid state drive, flash memory (e.g., a secure digital (SD) memory card, a mini-SD memory card, and/or a micro-SD memory card), universal serial bus (USB) memory devices, and the like. The memory 106, 128 may be configured to provide display information to the display device (e.g., the one or more display devices 112). In addition, the memory 106, 128 may be configured to store user input information from a user input device of a user interface. The memory 106, 128 may be housed in a common controller housing with the one or more processors. The memory 106, 128 may, alternatively or in addition, be located remotely with respect to the spatial location of the processors and/or a controller. For instance, the one or more processors and/or the controller may access a remote memory (e.g., server), accessible through a network (e.g., internet, intranet, and the like).

The aircraft controller 102 and/or the one or more offboard controllers 124 may be configured to perform one or more process steps, as defined by the one or more sets of program instructions 108, 130. The one or more process steps may be performed iteratively, concurrently, and/or sequentially. The one or more sets of program instructions 108, 130 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, Boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 108, 130 may be configured to operate via proportional control, feedback control, feedforward control, integral control, proportional-derivative (PD) control, proportional-integral (PI) control, proportional-integral-derivative (PID) control, or the like.

The one or more communication interfaces 110, 134 may be operatively configured to communicate with one or more components of the aircraft controller 102 and/or the one or more offboard controllers 124. For example, the one or more communication interfaces 110, 134 may also be coupled (e.g., physically, electrically, and/or communicatively) with the one or more processors 104, 126 to facilitate data transfer between components of the one or more components of the aircraft controller 102 and/or the one or more offboard controllers 124 and the one or more processors 104, 126. For instance, the one or more communication interfaces 110, 134 may be configured to retrieve data from the one or more processors 104, 126, or other devices, transmit data for storage in the memory 106, 128, retrieve data from storage in the memory 106, 128, or the like. By way of another example, the aircraft controller 102 and/or the one or more offboard controllers 124 may be configured to receive and/or acquire data or information from other systems or tools by a transmission medium that may include wireline and/or wireless portions. By way of another example, the aircraft controller 102 and/or the one or more offboard controllers 124 may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the aircraft controller 102 and/or the one or more offboard controllers 124 and the other subsystems (e.g., of the aircraft 100 and/or the system 138). In addition, the aircraft controller 102 and/or the one or more offboard controllers 124 may be configured to send data to external systems via a transmission medium (e.g., network connection).

The one or more display devices 112 may include any display device known in the art. For example, the display devices 112 may include, but are not limited to, one or more head-down displays (HDDs), one or more HUDs, one or more multi-function displays (MFDs), or the like. For instance, the display devices 112 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices 114 may include any user input device known in the art. For example, the user input device 114 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

Figure 2:
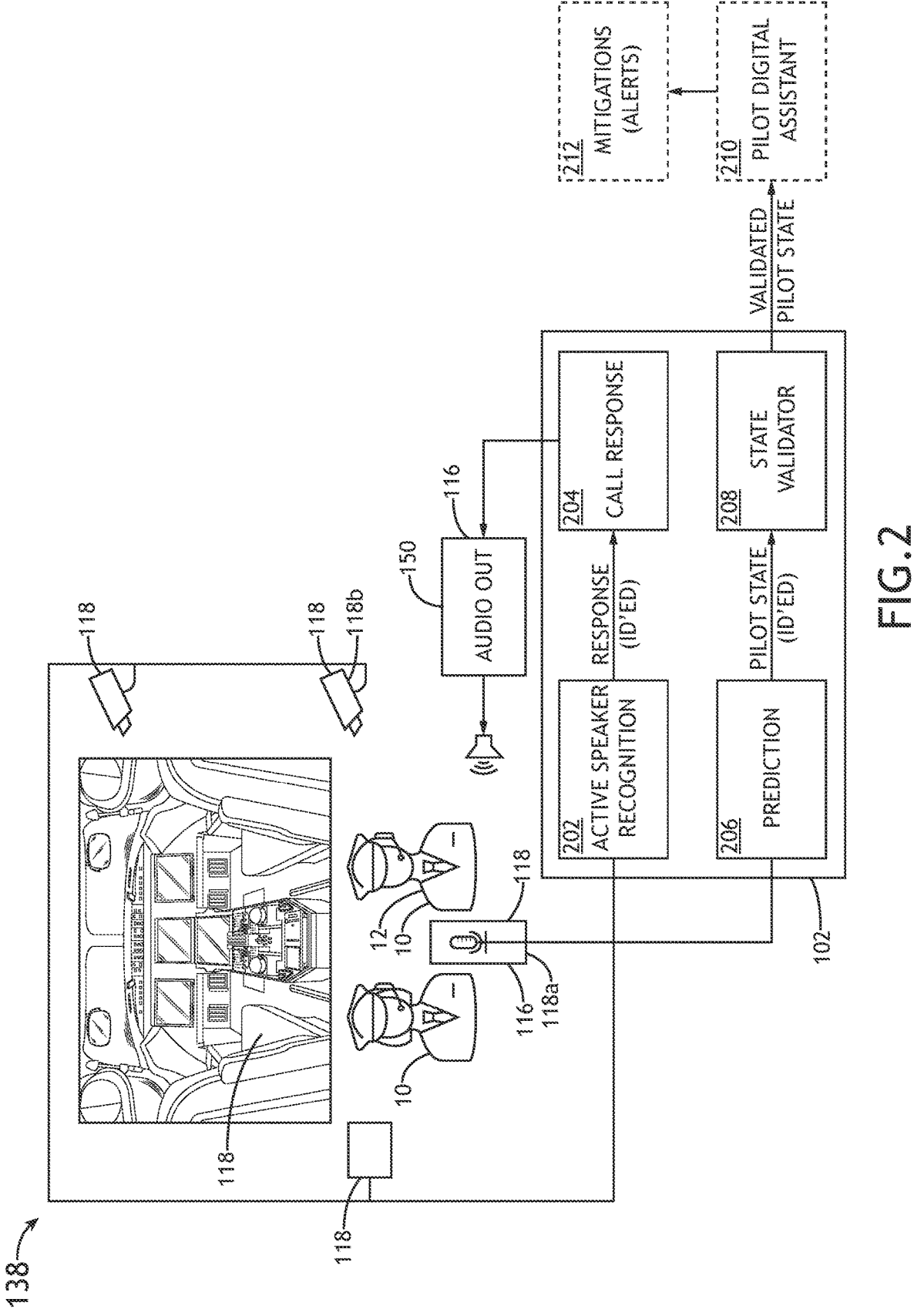
FIG. 2 is a conceptual block diagram of a system, in accordance with one or more embodiments of the present disclosure.

FIG. 2 illustrates a conceptual block diagram of a system 138, in accordance with one or more embodiments of the present disclosure.

The system 138 may include an audio sensor 118a. The audio sensor 118a may be configured to sense sensor data, which may include active speaker audio of an occupant 10 from two or more occupants. For example, the audio sensor 118a may include a microphone in an aircraft cockpit.

The system 138 may include a controller 102. The controller 102 may be communicatively coupled to the audio sensor 118a. The controller 102 may include one or more processors 104. The one or more processors 104 may be configured to execute program instructions stored on memory 106.

The system 138 may further include an incapacitation predictor module 206. The incapacitation predictor module 206 may be configured to predict a predicted incapacitation state of at least one of the occupants 10. This prediction may be based on occupant sensor data received from occupant capacity sensors 118.

The incapacitation predictor module 206 may act as an initial step for assessing the fitness of the occupants. It may be configured to analyze sensor data (e.g., from sensors 118 such as cameras, seat weight sensors, and/or any other sensor for monitoring pilots) to estimate the likelihood of an occupant 10 being incapacitated to a level that may affect their ability to perform necessary tasks. The predictor module 206 may utilize a variety of data types from various sensor 118, such as physiological indicators (heart rate, respiration rate, etc.), behavioral patterns (eye movement (e.g., closed eyes), gesture recognition) from camera sensors and the like, and/or inputs from environmental sensors (cabin pressure, oxygen levels) to make this assessment.

The module 206 may employ machine learning techniques to interpret the sensor data and learn from historical patterns. It may account for individual variability by referencing personalized profiles or baselines established for each occupant 10, such as baseline heartrates.

In the case of a suspected incapacitation, the module 206 may generate a trigger that activates other components within the system 138 to take further diagnostic or corrective action.

The system 138 may include a state validator module 208, a call response module 204, an incapacitation predictor module 206, an active speaker machine learning module 202, a pilot digital assistant module 210, and/or a mitigation module 212.

Modules may be hardware-based, software-based, or a combination of both, and may be designed to interface with other parts of the system in a seamless and integrated manner. In software terms, a module may consist of a collection of routines, protocols, functions, lines of code, and tools that provide a specific service or perform certain operations. For hardware, it could be a self-contained component or assembly that interacts with the system's other components.

The mitigation module 212 may be configured to direct the transmission of alerts (e.g., alert the ATC of an incapacitated pilot), such as sending the transmissions wirelessly to an ATC tower.

FIG. 3 illustrates a flow diagram illustrating steps performed in a method 300 for determining an incapacitation state of an occupant, in accordance with one or more embodiments of the present disclosure.

At step 310, sensor data may be received. The sensor data may include active speaker audio of an occupant 10 from the two or more occupants. For example, the sensor data may be digital audio data received from the audio sensor 118a (e.g., microphone). For example, the audio sensor 118a may include multiple audio sensors 118a throughout the cockpit, configured to be capable of hearing all occupants.

At step 320, the occupant 10 may be identified as the active speaker. This identification may be based on the sensor data.

During the identification process, various techniques may be employed to ascertain which occupant 10 is currently speaking. In embodiments, an active speaker machine learning module 202 may be used to identify the active speaker 12. For example, the active speaker machine learning module 202 may include an end-to-end neural network active speaker recognition module, which may exploit spatial-temporal data to identify the active speaker 12. In some examples, voice recognition technology can be utilized to match the received audio with stored voice profiles of the occupants 10. Alternatively, and/or in addition, the system 138 may use directional microphones to determine the active speaker's location. The system 138 may include a combination of audio analysis and seat sensors to infer which occupant is speaking. The accuracy of identification may ensure that subsequent steps in the method are associated with the correct individual.

At step 330, an identification code may be assigned to the occupant 10. This assignment may be based on the identification of the occupant 10 as the active speaker. Upon successful identification of the active speaker, the system 138 assigns a unique identification code to occupant 10. This identification code may serve as a digital fingerprint, distinguishing occupant 10 from others within the environment. The code may be a temporary identifier used solely for the duration of the current session or flight, or it could be linked to a more permanent profile if the system 138 is designed to recognize repeat occupants. The assignment of this identification code facilitates tracking of interactions and responses from the specific occupant 10 throughout the capacitation determination process.

At step 340, a trigger may be received. This trigger may be associated with the identification code and the occupant 10. The trigger may be based on the occupant sensor data. The controller 102 may be further configured to validate the incapacitation state based on the trigger. The trigger at step 340 may act as a catalyst for further action, signaling the system 138 to proceed with the incapacitation state assessment. It may arise from a sensed specific phrase detected in the occupant's speech, a change in the occupant's tone or stress levels indicative of their state, a manual input from the flight crew. However, the descriptions herein are not necessarily limiting, and a trigger may be generated in a number of ways (e.g., from a seat weight sensor sensing an empty seat).

For example, the state validator module 208 may receive a trigger from the incapacitation predictor module 206. For instance, the state validator module 208 may be configured to send the trigger based on a predicted incapacitation state. For instance, if the predicted incapacitation state exists, a trigger may be sent. For instance, if the predicted incapacitation state is above a threshold (e.g., above a value, above 10% chance of incapacitation, and/or the like), a trigger may be configured to be sent. In this way, the state validator module 208 may receive triggers and call upon the call response module 204 to validate capacitation.

At step 350, a call response module 204 may be queried. This query may be based on the trigger. The call response module 204 may be configured to generate and direct a communication to the occupant 10 and receive an audio response from the occupant 10.

For example, upon receiving the trigger, a communication may be generated and be configured to elicit information from the occupant 10 that will aid in assessing their state. For instance, the query could be a direct question about the occupant's well-being or a request for them to perform a task. The call response module 204 may include a machine learning module. The call response module 204 may be configured to generate synthetic audio speech (e.g., voice-to-text machine learning models) of the communication.

At step 360, an occupant state of the occupant 10 may be determined. This determination may be based on the audio response from the occupant 10.

For example, the call response module 204 may be configured to determine/confirm the requested response matches the request (e.g., if an affirmative response was given to a corresponding question of capacitance) and was provided by the ID'ed occupant (e.g., rather than a different pilot) and provide the answer/results to the state validator module 208. For example, this determination may be performed by a machine learning model and/or a voice-to-text (heuristic code). For instance, if the text of the response is affirmative (e.g., "yes"), then the answer may be affirmative capacitance sent to the state validator module 208.

Following the query, step 360 may involve an analysis of the occupant's audio response, such as via the machine learning module. The call response module 204, equipped with advanced machine learning capabilities, may process the occupant's reply to assess various parameters such as any response at all or a confirmation (e.g., speech to text data of the occupant stating "yes", "affirmative"). The call response module 204 may process the occupant's reply to assess various parameters such as speech clarity, coherence, reaction time, and emotional state. For example, a clear and prompt response may indicate that the occupant is fully capacitated, whereas hesitation, slurred speech, or inappropriate reactions might suggest impairment (e.g., hypoxia, delirium, stroke, and/or the like).

In embodiments, based on the returned answer, the state validator module 208 may either confirm a false-positive, require another validation (e.g., such as performing a validation up to three times), and/or confirm the pilot state and notify the pilot digital assistant module 210 for further decision-making actions and/or mitigations (e.g., alerts).

At step 370, an aircraft operation may be directed. This direction may be based on the occupant state of the occupant 10. The pilot digital assistant module 210 may be configured to take appropriate measures to ensure the continued safety and efficiency of the aircraft operations. This may include adjusting the flight plan, engaging autopilot systems, or communicating with ground control for assistance, depending on the validated state of the occupant 10.

In embodiments, alternatively, if the occupant state of the occupant 10 is in capacity (e.g., if the pilot is fully conscious), then the process may end and/or the system may do nothing. For example, if the occupant 10 confirms they are able to fly the aircraft by stating an affirmative (e.g., "I am here", or the like), the system may prevent or abstain from other actions such as directing autopilot takeover, alerting ATC, and/or confirming a lack of consciousness.

The aircraft operation may include an autopilot landing procedure. The aircraft operation may include a transmission to Air Traffic Control (ATC) to request a landing location. For example, the system 138 may take the determined occupant state and translate it into actionable measures that can affect aircraft operations. If the occupant 10 is deemed incapacitated, the system may initiate an autopilot landing procedure to ensure a safe descent. Alternatively, and/or in addition, it may transmit a request to ATC for a priority landing spot and/or medical assistance upon landing.

The controller 102 may be further configured to perform the querying and the determining of the occupant state multiple times in sequence to confirm the occupant state. For example, steps 350 and 360 may be configured to be performed multiple times (e.g., two times, three times) before step 370. The aircraft operations may be received via a pilot digital assistant module 210. For example, the pilot digital assistant module 210 may use the aircraft operations (e.g., command to initiate emergency landing) to initiate an autopilot landing procedure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "in embodiments", "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A method for determining an incapacitation state of an occupant, the method comprising:

receiving sensor data including active speaker audio of an occupant of two or more occupants;

identifying the occupant as an active speaker, based on the sensor data;

assigning an identification code to the occupant based on the identification of the occupant as the active speaker;

receiving a trigger associated with the identification code and the occupant;

querying a call response module based on the trigger, wherein the call response module is configured to generate and direct a communication to the occupant and receive an audio response from the occupant;

determining an occupant state of the occupant based on the audio response from the occupant; and directing an aircraft operation based on the occupant state.

2. The method of claim 1, wherein the call response module comprises a machine learning module.

3. The method of claim 1, wherein the call response module is configured to generate synthetic audio speech of the communication.

4. The method of claim 1, further comprising:

receiving occupant sensor data from one or more occupant capacity sensors configured to sense an incapacitation state of at least one of the two or more occupants via an incapacitation predictor module; and predicting a predicted incapacitation state of at least one of the two or more occupants based on the occupant sensor data.

5. The method of claim 4, wherein the trigger is based on the occupant sensor data, wherein the query is configured to validate the predicted incapacitation state.

6. The method of claim 4, wherein the query is configured to be generated by a state validator module.

7. The method of claim 1, wherein the aircraft operation is received via a pilot digital assistant module.

8. The method of claim 1, wherein the aircraft operation comprises an autopilot landing procedure.

9. The method of claim 1, wherein the aircraft operation comprises a transmission to Air Traffic Control (ATC) to request a landing location.

10. The method of claim 1, wherein the querying and the determining the occupant state are performed multiple times in sequence to confirm the occupant state at any instant in time during flight.

11. A system for determining an incapacitation state of an occupant, the system comprising:

an audio sensor configured to sense sensor data including active speaker audio of an occupant of two or more occupants; and a controller communicatively coupled to the audio sensor, the controller comprising one or more processors configured to execute program instructions causing the one or more processors to:

receive the sensor data including the active speaker audio of the occupant of the two or more occupants;

identify the occupant as an active speaker, based on the sensor data;

assign an identification code to the occupant based on the identification of the occupant as the active speaker;

receive a trigger associated with the identification code and the occupant;

query a call response module based on the trigger, wherein the call response module is configured to generate and direct a communication to the occupant and receive an audio response from the occupant;

determine an occupant state of the occupant based on the audio response from the occupant; and direct an aircraft operation based on the occupant state.

12. The system of claim 11, wherein the call response module comprises a machine learning module.

13. The system of claim 11, wherein the call response module is configured to generate synthetic audio speech of the communication.

14. The system of claim 11, further comprising an incapacitation predictor module configured to predict a predicted incapacitation state of at least one of the two or more occupants based on occupant sensor data received via one or more occupant capacity sensors.

15. The system of claim 14, wherein the trigger is based on the occupant sensor data, and wherein the controller is further configured to validate the predicted incapacitation state based on the trigger.

16. The system of claim 14, wherein the controller is further configured to generate a query through a state validator module based on the trigger.

17. The system of claim 11, wherein the controller is further configured to receive aircraft operation instructions via a pilot digital assistant module.

18. The system of claim 11, wherein the aircraft operation comprises an autopilot landing procedure.

19. The system of claim 11, wherein the aircraft operation comprises a transmission to Air Traffic Control (ATC) to request a landing location.

20. The system of claim 11, wherein the controller is further configured to perform the querying and determining of the occupant state multiple times in sequence to confirm the occupant state.

\* \* \* \* \*